(12) United States Patent
Moman et al.

(10) Patent No.: US 11,192,962 B2
(45) Date of Patent: Dec. 7, 2021

(54) PROCESS TO PREPARE PROCATALYST FOR POLYMERIZATION OF OLEFINS

(71) Applicant: SABIC GLOBAL TECHNOLOGIES B.V., Bergen op Zoom (NL)

(72) Inventors: Akhlaq Moman, Geleen (NL); Inaamul Haq Siddiqui, Geleen (NL); Sudhakar R. Padmanabhan, Geleen (NL); Osamah Al-Humaidan, Riyadh (SA); Haitham Al-Enazi, Riyadh (SA)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 191 days.

(21) Appl. No.: 16/336,993

(22) PCT Filed: Jun. 19, 2017

(86) PCT No.: PCT/EP2017/064951
§ 371 (c)(1),
(2) Date: Mar. 27, 2019

(87) PCT Pub. No.: WO2018/059750
PCT Pub. Date: Apr. 5, 2018

(65) Prior Publication Data
US 2020/0055968 A1 Feb. 20, 2020

Related U.S. Application Data

(60) Provisional application No. 62/469,594, filed on Mar. 10, 2017.

(30) Foreign Application Priority Data

Sep. 29, 2016 (EP) .................................... 16191492

(51) Int. Cl.
C08F 4/651 (2006.01)
C08F 4/656 (2006.01)
C08F 210/06 (2006.01)
C08F 110/06 (2006.01)

(52) U.S. Cl.
CPC ............ C08F 4/651 (2013.01); C08F 4/6565 (2013.01); C08F 210/06 (2013.01)

(58) Field of Classification Search
CPC ...... C08F 4/651; C08F 4/6565; C08F 210/06; C08F 110/06
See application file for complete search history.

(56) References Cited

U.S. PATENT DOCUMENTS

| | | | |
|---|---|---|---|
| 4,946,816 A | 8/1990 | Cohen et al. | |
| 6,780,808 B2 | 8/2004 | Wagner et al. | |
| 2011/0269928 A1 | 11/2011 | Fujiwara et al. | |
| 2013/0225398 A1 | 8/2013 | Chen et al. | |
| 2015/0299346 A1 | 10/2015 | Chen et al. | |
| 2019/0225715 A1 | 7/2019 | Moman et al. | |
| 2019/0225716 A1 | 7/2019 | Sainani et al. | |
| 2019/0225718 A1 | 7/2019 | Sainani et al. | |
| 2020/0048378 A1 | 2/2020 | Moman et al. | |

FOREIGN PATENT DOCUMENTS

| | | | | |
|---|---|---|---|---|
| EP | 0613912 A2 | 9/1994 | | |
| EP | 1538167 A1 | 6/2005 | | |
| EP | 1783145 A1 | 5/2007 | | |
| EP | 2027164 B1 | 8/2012 | | |
| WO | 9632427 A1 | 10/1996 | | |
| WO | 2011106494 A1 | 9/2011 | | |
| WO | 2013124063 A1 | 8/2013 | | |
| WO | 2014001257 A1 | 1/2014 | | |
| WO | 2015091983 A1 | 6/2015 | | |
| WO | 2015091984 A1 | 6/2015 | | |
| WO | WO-2015091982 A1 * | 6/2015 | ............ | C08F 210/16 |
| WO | 2015185489 A1 | 12/2015 | | |
| WO | 2015185490 A1 | 12/2015 | | |
| WO | 2015193291 A1 | 12/2015 | | |

OTHER PUBLICATIONS

International Search Report for International Application No. PCT/EP2017/064951, International Filing Date Jun. 19, 2017, dated Jul. 27, 2017, 5 pages.
Written Opinion for International Application No. PCT/EP2017/064951, International Filing Date Jun. 19, 2017, dated Jul. 27, 2017, 6 pages.
Pasquini, N (ed.) "Polypropylene handbook," Carl Hanser Verlag Munich; 2005, 11 Pages, 2nd edition, Chapter 6.2.
Pullukat, Thomas J. and Hoff, Raymond E., "Silica-Bases Ziegler-Natta Cataiystis: A Patent Review", Catal. Rev.-Sci. Eng. 41(3&4), 1999, pp. 389-438.

* cited by examiner

*Primary Examiner* — Catherine S Branch
(74) *Attorney, Agent, or Firm* — Cantor Colburn LLP

(57) ABSTRACT

The present invention relates to a process for the preparation of a procatalyst suitable for preparing a catalyst composition for olefin polymerization, said process comprising the steps of: Step A) providing or preparing a Grignard compound; Step B) contacting the Grignard compound an alkoxy- or aryloxy silane compound, to give a solid support; Step C) optionally contacting the solid support obtained with at least one activating compound; and Step D) reacting the (activated) support with a halogen-containing Ti-compound as catalytic species, an activator and at least one internal electron donor in several sub steps wherein the internal donor is added in portions during at least two of said stages to obtain a procatalyst. The invention moreover relates to a procatalyst, a catalytic system comprising said procatalyst and to a process to prepare polyolefins using said catalyst system and the polyolefins obtained therewith.

16 Claims, No Drawings

PROCESS TO PREPARE PROCATALYST FOR POLYMERIZATION OF OLEFINS

CROSS REFERENCE TO RELATED APPLICATIONS

This application is a National Stage application of PCT/EP2017/064951, filed Jun. 19, 2017, which claims the benefit of U.S. Application No. 62/469,594, filed Mar. 10, 2017, and European Application No. 16191492.4, filed Sep. 29, 2016, all of which are incorporated by reference in their entirety herein.

BACKGROUND

The invention relates to a process to prepare a procatalyst for polymerization of olefins comprising an activator and an internal donor. The invention also relates to said procatalyst obtained. Furthermore, the invention is directed to a catalyst system for polymerization of olefins comprising said procatalyst, optionally a co-catalyst and optionally an external electron donor. In addition, the invention is related to a process of making polyolefins by contacting at least one olefin with said catalyst system. Moreover, the present invention relates to polymers obtained by polymerization using said procatalyst and to the shaped articles of said polymers.

Catalyst systems and their components that are suitable for preparing a polyolefin are generally known. One type of such catalysts is generally referred to as Ziegler-Natta catalysts. The term "Ziegler-Natta" is known in the art and it typically refers to catalyst systems comprising an organometallic compound (also typically referred to as a co-catalyst) and optionally one or more electron donor compounds (e.g. external electron donors) and a transition metal-containing solid catalyst compound (also typically referred to as a procatalyst), comprising a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1. There is, an on-going need in industry for phthalate free catalyst for preparing polymers.

It is an object of the invention to provide an improved process for a phthalate free procatalyst for polymerization of olefins. It is a further object of the present invention is to provide a procatalyst which shows good performance, especially shows an improved productivity, bulk density and Mn (low oligomers) and a narrow MWD.

SUMMARY

At least one of the aforementioned objects of the present invention is achieved with the several aspects discussed below.

The present invention relates to a process for the preparation of a procatalyst suitable for preparing a catalyst composition for olefin polymerization, said process comprising the steps of: Step A) providing or preparing a Grignard compound; Step B) contacting the Grignard compound an alkoxy- or aryloxy silane compound, to give a solid support; Step C) optionally contacting the solid support obtained with at least one activating compound; and Step D) reacting the (activated) support with a halogen-containing Ti-compound as catalytic species, an activator and at least one internal electron donor in several sub steps wherein the internal donor is added in portions during at least two of said stages to obtain a procatalyst.

A first aspect of the present invention, is a process for the preparation of a procatalyst suitable for preparing a catalyst composition for olefin polymerization, said process comprising the steps as disclosed in claim 1. This process involves the split addition of the internal donor.

A second aspect of the present invention, is shown in claim 10. This process involves a decreased temperature during the addition of the activator and optionally internal donor and/or involves an increased mixing time during titanation stages I and/or II of step D for preparing the procatalyst. A third aspect of the present invention, is a procatalyst obtained or obtainable or directly obtainable by the process according to the invention. A fourth aspect of the present invention, is a process for the preparation of polyolefins, preferably polypropylene, comprising the contacting of a procatalyst with an olefin, and optionally an external donor and/or optionally a co-catalyst or contacting a catalyst system—comprising a procatalyst, an external donor and a co-catalyst, with an olefin. A fifth aspect of the present invention, is a polyolefin, preferably a polypropylene, obtainable or directly obtainable by said process. A sixth aspect of the present invention is a shaped article of said polyolefin. These aspects and embodiments will be described in more detail below.

Definitions

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprises catalytic species supported on a metal or metalloid compound (e.g. a magnesium compound or a silica compound).

"catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N).

"external donor" or "external electron donor" or "ED" as used in the present description means: an electron-donating compound used as a reactant in the polymerisation of olefins. It comprises at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals.

Where in the description the terms metal modifier or metal-based modifier is used, Group 13- or transition metal modifier is meant.

"procatalyst" as used in the present description have the same meaning: a component of a catalyst composition generally comprising a solid support, a transition metal-containing catalytic species and optionally one or more internal donor.

"halide" or "halogen" as used in the present description means: an ion selected from the group of: fluoride (F—), chloride (Cl—), bromide (Br—) or iodide (I—).

"Heteroatom" as used in the present description means: an atom other than carbon or hydrogen. However, as used herein—unless specified otherwise, such as below,—when "one or more hetereoatoms" is used one or more of the following is meant: F, Cl, Br, I, N, O, P, B, S or Si. Thus a heteroatom also includes halides.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl. A hydrocarbyl group may be substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. An alkyl group also encloses aralkyl groups wherein one or more hydrogen atoms of the alkyl group have been replaced by aryl groups.

"aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"alkoxide" or "alkoxy" as used in the present description means: a functional group or side-chain obtained from an alkyl alcohol. It consists of an alkyl bonded to a negatively charged oxygen atom.

"aryloxide" or "aryloxy" or "phenoxide" as used in the present description means: a functional group or side-chain obtained from an aryl alcohol. It consists of an aryl bonded to a negatively charged oxygen atom.

"Grignard reagent" or "Grignard compound" as used in the present description means: a compound or a mixture of compounds of formula $R^4_z MgX^4_{2-z}$ ($R^4$, z, and $X^4$ are as defined below) or it may be a complex having more Mg clusters, e.g. $R_4Mg_3Cl_2$.

"polymer" as used in the present description means: a chemical compound comprising repeating structural units, wherein the structural units are monomers.

"olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"MWD" or "Molecular weight distribution" as used in the present description means: the same as "PDI" or "polydispersity index". It is the ratio of the weight-average molecular weight ($M_w$) to the number average molecular weight ($M_n$), viz. $M_w/M_n$, and is used as a measure of the broadness of molecular weight distribution of a polymer. $M_w$ and $M_n$ are determined by GPC using a Waters 150° C. gel permeation chromatograph combined with a Viscotek 100 differential viscosimeter; the chromatograms were run at 140° C. using 1,2,4-trichlorobenzene as a solvent; the refractive index detector was used to collect the signal for molecular weights.

"bulk density" as used in the present description means: the weight per unit volume of a material, including voids inherent in the material as tested. Bulk density is measured as apparent density according to ASTM D1895-96 Reapproved 2010-e1, test method A.

"XS" or "xylene soluble fraction" or "CXS" or "cold soluble xylene fraction" as used in the present description means: the weight percentage (wt. %) of soluble xylene in the isolated polymer, measured according to ASTM D 5492-10.

"polymerization conditions" as used in the present description means: temperature and pressure parameters within a polymerization reactor suitable for promoting polymerization between the catalyst composition and an olefin to form the desired polymer. These conditions depend on the type of polymerization used.

"production rate" or "yield" as used in the present description means: the amount of kilograms of polymer produced per gram of procatalyst consumed in the polymerization reactor per hour, unless stated otherwise.

"MFR" or "Melt Flow rate" as used in the present description is measured at a temperature of 230° C. with 2.16 kg load and measured according to ISO 1133:2005.

Unless stated otherwise, when it is stated that any R group is "independently selected from" this means that when several of the same R groups are present in a molecule they may have the same meaning or they may not have the same meaning. The present invention is described below in more detail. All embodiments described with respect to one aspect of the present invention are also applicable to the other aspects of the invention, unless otherwise stated.

DETAILED DESCRIPTION OF EMBODIMENTS

It has been surprisingly found that the properties of the procatalyst can be improved by an improved method according to the first or second aspects of the present invention.

An advantage of the present invention is that high catalyst productivity is obtained. Another advantage is the increased bulk density of the polyolefin obtained. Another advantage is a more narrow molecular weight distribution of the polyolefin that is obtained. Another advantage is the increased Mn (low oligomers) and low xylene solubles of the polyolefin obtained. Hence enhanced product physical and mechanical properties are expected such as for fibres, injection molded products and films when such products are obtained using the present invention.

As stated above, the first aspect of the invention relates to a multistep process comprising steps A), B), C) and D): viz. to a process for the preparation of a procatalyst suitable for preparing a catalyst composition for olefin polymerization, said process comprising the steps of: Step A) providing or preparing a Grignard compound; Step B) contacting the Grignard compound an alkoxy- or aryloxy silane compound, to give a solid support; Step C) optionally contacting the solid support obtained with at least one activating compound; and Step D) reacting the (activated) support with a halogen-containing Ti-compound as catalytic species, an activator and at least one internal electron donor in several sub steps wherein the internal donor is added in portions during at least two of said stages to obtain a procatalyst. Each of these steps is disclosed in more detail below. These steps are shown in claims 1 and 10 for the first and second aspects of the invention.

Preferably, the Ziegler-Natta type procatalyst in the catalyst system according to the present invention is obtained by the process that is similar to the process as described in EP202716B1I. Example I including all sub-examples (IA-IE) is incorporated into the present description. More details about the different embodiments are disclosed starting in paragraphs [0016] to [0089]. All these embodiments related to the process and products are incorporated by reference into the present description. In the following part of the description the different steps and phases of the process for preparing the procatalyst according to the present invention will be discussed.

The process for preparing a procatalyst according to the present invention comprises the following phases or steps
  phase I): preparing a solid support for the procatalyst (Step A and Step B);
  phase II): optionally activating said solid support obtained in phase I using one or more activating compounds to obtain an activated solid support; (Step C);
  phase III): contacting said solid support obtained in phase I or said activated solid support in phase II with a catalytic species, an activator and at least one internal donor (Step D);
  and optionally Phase IV): modifying said intermediate product obtained in phase III wherein phase IV may comprise one of the following: modifying said intermediate product obtained in phase III with a Group 13- or transition metal modifier in case an internal donor was used during phase III, in order to obtain a procatalyst; modifying said intermediate product obtained in phase III with a Group 13- or transition metal modifier and an internal donor in case an activator was used during phase III, in order to obtain a procatalyst.

The procatalyst thus prepared can be used in polymerization of olefins using e.g. an external electron donor and a co-catalyst. The various steps used to prepare the catalyst according to the present invention are described in more detail below.

Phase I: Preparing a Solid Support for the Catalyst.

The process for preparing the solid support for the procatalyst according to the present invention comprises the following steps: step A) provision or preparation of a Grignard reagent; and Step B) reacting a Grignard compound with a silane compound.

Step A) may include the provision of a previously prepared or commercially obtained Grignard reagent or may include the preparation of a Grignard reagent. Said Grignard reagent that is provided or prepared in step A is a compound $R^4_z MgX^4_{2-z}$. $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl, more preferably butyl. $X^4$ is independently selected from the group consisting of fluoride (F—), chloride (Cl—), bromide (Br—) or iodide (I—), preferably chloride. z is in a range of larger than 0 and smaller than 2, being $0<z<2$. For example $R^4_z MgX^4_{2-z}$ is n-butyl magnesium chloride or phenyl magnesium chloride wherein $R_4$ is respectively n-butyl and phenyl, z=1 and X=Cl. Step A) including many embodiments, is described in detail in WO2015091984 A1 of the same applicant, page 15 line 14 to page 16, line 28, which complete section is incorporated here by reference.

Step B) includes contacting the compound $R^4_z MgX^4_{2-z}$ ($R^4$ and $X^4$ being the same as above) with a silane compound $Si(OR^5)_{4-n}(R^6)_n$ to give a first intermediate reaction product, being a solid $Mg(OR^1)_x X^1_{2-x}$ wherein $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^1$ is independently selected from the group of consisting of fluoride (F—), chloride (Cl—), bromide (Br—) or iodide (I—), preferably chloride; z is in a range of larger than 0 and smaller than 2, being $0<z<2$. Preferably tetra-ethoxysilane (TES; $R^5$ is ethyl, and n=0) is used during step B) as the silane compound to provide $Mg(OR^1)_x X^1_{2-x}$ wherein $R^1$ is Et and $X^1$ is Cl. Step B), including many embodiments, is described in detail in WO2015091984 A1, page 16 line 30 to page 22, line 25, which complete section is incorporated here by reference. Preferably a butyl Grignard is used during step A).

Phase II: Activating Said Solid Support for the Catalyst (Step C).

This step of activating said solid support for the catalyst is an optional step that is not required, but is preferred, in the present invention. This phase may comprise one or more stages.

Step C) relates to the activation of the solid magnesium compound and this step, including many embodiments, is described in detail in WO2015091984 A1 of the same applicant, page 23 line 3 to page 28, line 14, which complete section is incorporated here by reference. According to the present invention, the solid support and procatalyst preferably have an average particle size (or APS) of between 18-30 microns. The particle size is measured using a test method based on ASTM standard test method D4464-201.

Step C) includes optionally contacting the solid support obtained in step B) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate reaction product; wherein: $M^1$ is a metal selected from the group consisting of Ti, Zr, Hf, Al or Si; $M^2$ is a metal being Si; v is the valency of $M^1$ or $M^2$ and w<v, such as 0, 1, or 2; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms. Preferably as activating electron donor an alcohol is used, such as methanol or ethanol, ethanol being more preferred. Preferably as metal alkoxide is used a compound wherein $M^1$=Ti, w=0; $R^2$=ethyl, being titanium tetraethoxide (TET). In a preferred embodiment, a combination of both an activating electron donor and a metal alkoxide compound is used, e.g. TET and ethanol.

In an embodiment, step C) comprises an activation step with an activating electron donor and a metal alkoxide compound of formula $M^1(OR^2)_{v-w}(OR^3)_w$, preferably methanol or ethanol, most preferred ethanol as activating electron donor and titanium tetraethoxide (TET) as metal alkoxide compound. Ethanol is preferred over methanol in view of the toxicity of methanol.

Phase III: Preparing the Procatalyst

Step D) involves reacting the first or second intermediate reaction product, obtained respectively in step B) or C), with a halogen-containing Ti-compound, an activator and at least one internal electron donor in several sub steps:

D-I) in a first stage: contacting the first or second intermediate reaction product, obtained respectively in step B) or C), with a halogen-containing Ti-compound, an activator and optionally a portion of an internal electron donor;

D-II) in a second stage: contacting the product obtained in step D-I) with a halogen-containing Ti-compound, and optionally a portion of an internal electron donor;

D-III) in a third stage: contacting the product obtained in step D-II) with a halogen-containing Ti-compound, and optionally a portion of an internal electron donor;

D-IV) optionally in a fourth stage: contacting the product obtained in step D-III) with a halogen-containing Ti-compound, and optionally a portion of an internal electron donor;

wherein said internal electron donor is added in at least two portions during at least two of the stages D-I, D-II, D-III, and D-IV to obtain said procatalyst.

This phase III, also called phase D, is described in detail in WO2015091984 A1 of the same applicant, page 28 line 15 to page 31, line 13, which complete section is incorporated here by reference.

Phase III may comprise several stages (e.g. I, II and III and optionally IV). During each of these consecutive stages the solid support is contacted with a catalytic species. In other words, the addition or reaction of said catalytic species may be repeated one or more times. Preferably, the same catalytic species is used each stage. Preferably $TiCl_4$ is used as catalytic species in all stages of step D). The catalyst species may be added first followed by addition of an activator and/or donor in any of the stages.

Catalytic Species

Step D) involves, in all sub steps reacting the (activated) solid support with a transition metal halide (e.g. titanium halide, chromium halide, hafnium halide, zirconium halide, vanadium halide) but preferably titanium halide, e.g. $TiX_4$ wherein X is chloride or fluoride, preferably chloride. Step D (also called step iii)) is described in detail in WO2015091984 A1 page 29 line 28 to page 31, line 13, which complete section is incorporated here by reference.

Activator

An activator is added during step D). The molar ratio of the activator relative to the magnesium may vary between wide limits, for instance from 0.02 to 1.0. Preferably, this molar ratio is from 0.05 to 0.8; more preferably from 0.1 to 0.6; and most preferably from 0.1 to 0.5. In an embodiment, an activator is present during this step D). Several types of activators can be used, such as benzamide, alkylbenzoates, and monoesters. Each of these will be discussed below.

A benzamide activator has a structure as disclosed in WO2015091983 A1 of the same applicant, page 13, line 13-page 14, line 37, which complete section is incorporated here by reference. A benzamide activator has a structure according to formula X:

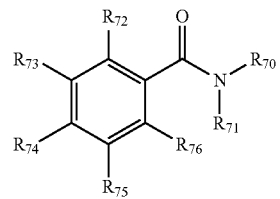

$R^{70}$ and $R^{71}$ are each independently selected from hydrogen or an alkyl. Preferably, said alkyl has from 1 to 6 carbon atoms, more preferably from 1 to 3 carbon atoms. More preferably, $R^{70}$ and $R^{71}$ are each independently selected from hydrogen or methyl.

$R^{72}$, $R^{73}$, $R^{74}$, $R^{75}$, $R^{76}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms.

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Other examples include monoethylbenzamide, diethylbenzamide, methylethylbenzamide, 2-(trifluor-methyl)benzamide, N,N-dimethyl-2-(trifluormethyl)benzamide, 3-(trifluormethyl)-benzamide, N,N-dimethyl-3-(trifluormethyl)benzamide, 2,4-dihydroxy-N-(2-hydroxyethyl)-benzamide, N-(1H-benzotriazol-1-ylmethyl) benzamide, 1-(4-ethylbenzoyl)piperazine, 1-benzoylpiperidine.

Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

A detailed description of regarding the use of mono-esters as activators is to be found in WO2015091984 A1 of the same applicant, page 42 line 12—page 43, line 24, which section is incorporated here by reference. A detailed description of regarding the use of alkylbenzoates as activators is to be found in WO2015091984 A1 of the same applicant, page 42 lines 1-12, which section is incorporated here by reference. The activation is for example selected from the group consisting of butyl formate, ethyl acetate, amyl acetate, butyl acetate, ethyl acrylate, methyl methacrylate, isobutyl methacrylate, an alkyl benzoate, such as ethyl p-methoxy benzoate, methyl p-ethoxybenzoate, ethyl p-ethoxybenzoate, ethyl benzoate, methyl benzoate, propyl benzoate, ethyl p-chlorobenzoate, ethyl p-bromobenzoate, methyl-p-toluate and ethyl-naphthate; preferably ethyl acetate, ethyl benzoate, benzoyl chloride, ethyl p-bromobenzoate, n-propyl benzoate, and benzoic anhydride, more preferably ethyl benzoate.

Internal Donors

An internal electron donor is also present during step D). Also mixtures of internal electron donors can be used. Examples of internal electron donors are disclosed below. The molar ratio of the internal electron donor relative to the magnesium may vary between wide limits, for instance from 0.01 to 0.75. Preferably, this molar ratio is from 0.02 to 0.5; more preferably from 0.03 to 0.3. The internal donor may be added in one single portion during one of the stages I, II, III or IV. The internal donor may also be added in split portions, e.g. in two portions or in three portions or even more. When the internal donor is added in two portions it may for example be added in Stage I and II or in stage II and III. When the internal donor is added in three portions, it may for example be added in stages I, II and III or in stages II, III and IV.

In an embodiment, the internal electron donor is added in two portions wherein the amount of internal donor is split between these two portions in a weight ratio of from 80%:20% to 20%:80%, more preferably 60%:40% to 40%:60%, most preferably approximately 50%:50%.

In an embodiment, the internal electron donor is added in three portions wherein the amount of internal donor is split between these three portions in a weight ratio of from 20% to 40% for each portion, wherein the total of the three portions is 100%, most preferably each portion is between 30 to 35% of the total amount of the internal donor.

In an embodiment, as internal donor an carbonate-carbamate compound according to formula A is used:

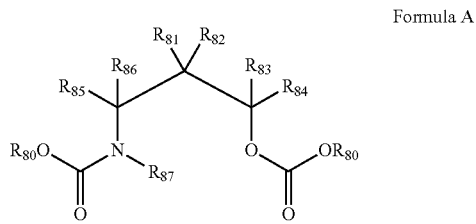

Formula A wherein: $R^{81}$, $R^{82}$, $R^{83}$, $R^{84}$, $R^{85}$, and $R^{86}$ are the same or different and are independently selected from a group consisting of hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{87}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; each $R^{80}$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^{80}$ is preferably selected from the group consisting of alkyl having 1 to 30 carbon atoms, preferably 1 to 20 carbon atoms, more preferably 1 to 6 carbon atoms, even more preferably methyl, ethyl, n propyl, i-propyl, n-butyl, 2-butyl, t-butyl, pentyl or hexyl, most preferably ethyl. N is a nitrogen atom; O is an oxygen atom; and C is a carbon atom; preferably 4-[(ethoxycarbonyl)(methyl)amino]pentan-2-yl ethyl carbamate (AB-OEt).

More information about this internal electron donor an several embodiments can be found in in WO2015/185489 which is incorporated by reference into the present application. The preparation of this donor is disclosed in WO2015/185489, Example A which is incorporated by reference into the present application.

In an embodiment, the activator is added during stage I and the internal donor is added during stages II and III and optionally IV, preferably said activator being a monoester, and the internal donor being a carbonate-carbamate. In a specific embodiment the activator EB is added during stage I and AB-OEt is added during stage II and stage III. In a specific embodiment the activator EB is added during stage I and AB-OEt is added during stages II, III and IV.

In an embodiment, during stage I of step D, EB is added as activator and wherein during stages II, III and IV, AB-OEt is added as internal donor in three portions, each portion having a weight ratio of from 30 to 35% wherein the total of the three portions equals 100%.

In an embodiment, during stage I of step D, EB is added as activator and wherein during stages II and III, AB-OEt is added as internal donor in two portions, each portion having a weight ratio of from 60%:40% to 40%:60% wherein the total of the two portions equals 100%.

More information about this internal electron donor an several embodiments can be found in in WO2015/185489 which is incorporated by reference into the present application. The preparation of this donor is disclosed in WO2015/185489, Example A which is incorporated by reference into the present application.

In a special embodiment, butyl magnesium Grignard is used in step A), TES is used in step B), TET and Ethanol are used in step C), $TiCl_4$ is used as catalytic species in all stages of step D); EB is used as activator in step D-I), AB-OEt is used as internal donor in stages II and III. In a special embodiment, butyl magnesium Grignard is used in step A), TES is used in step B), TET and Ethanol are first used in step C) and then ethanol is used in step C), $TiCl_4$ is used as catalytic species in all stages of step D); EB is used as activator in step D-I), AB-OEt is used as internal donor in stages II and III. In a special embodiment, butyl magnesium Grignard is used in step A), TES is used in step B), TET and Ethanol are used in step C), $TiCl_4$ is used as catalytic species in all stages of step D); EB is used as activator in step D-I), AB-OEt is used as internal donor in stages II, III and IV.

In an embodiment, as internal donor a aminobenzoate compound according to Formula B is used

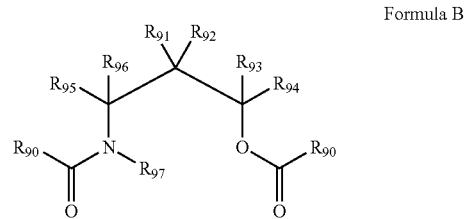

Formula B wherein: each $R^{90}$ group is independently a substituted or unsubstituted aromatic group; $R^{91}$, $R^{92}$, $R^{93}$, $R^{94}$, $R^{95}$, $R^{96}$ and $R^{97}$ are each independently the same or different and are independently selected from a group consisting of hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; N is nitrogen atom; O is oxygen atom;

and C is carbon atom; preferably 4-[benzoyl(methyl)amino]pentan-2-yl benzoate (AB). More information about this internal electron donor an several embodiments can be found in in WO2014/001257 which is incorporated by reference into the present application. The preparation of this donor is disclosed in WO2014/001257, Examples which is incorporated by reference into the present application.

In an embodiment, the activator is added during stage I and the internal donor is added during stage III. In an embodiment, the activator is added during stage I and the internal donor is added during stage II and III and optionally IV. Preferably said activator being a monoester, and the internal donor being an aminobenzoate. In a specific embodiment the activator EB is added during stage I and AB is added during stage III. In a specific embodiment the activator EB is added during stage I and AB is added during stages II and III. In a specific embodiment the activator EB is added during stage I and AB is added during stages II and III and IV.

In an embodiment, during stage I of step D EB is added as activator and wherein during stages II and III AB is added as internal donor in two portions, each portion having a weight ratio of from 60%:40% to 40%:60% wherein the total of the two portions equals 100%.

In an embodiment, during stage I of step D, EB is added as activator and wherein during stages II, III and IV, AB is added as internal donor in three portions, each portion having a weight ratio of from 30 to 35% wherein the total of the three portions equals 100%.

In a special embodiment, butyl magnesium Grignard is used in step A), TES is used in step B), TET and Ethanol are used in step C), TiCl$_4$ is used as catalytic species in all stages of step D); EB is used as activator in step D-I), AB is used as internal donor in stages II and III. In a special embodiment, butyl magnesium Grignard is used in step A), TES is used in step B), TET and ethanol are first used in step C), TiCl$_4$ is used as catalytic species in all stages of step D); EB is used as activator in step D-I), AB is used as internal donor in stage III. In a special embodiment, butyl magnesium Grignard is used in step A), TES is used in step B), TET and ethanol are used in step C), TiCl$_4$ is used as catalytic species in all stages of step D); EB is used as activator in step D-I), AB is used as internal donor in stages II and III. In a special embodiment, butyl magnesium Grignard is used in step A), TES is used in step B), TET and Ethanol are first used in step C) and then ethanol is used in step C), TiCl$_4$ is used as catalytic species in all stages of step D); EB is used as activator in step D-I), AB is used as internal donor in stages II, III and IV.

In an embodiment, as internal donor a 1,3-diether represented by the Formula C, is used:

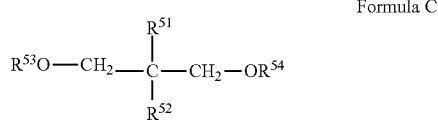

Formula C wherein $R^{51}$ and $R^{52}$ are each independently selected from a hydrogen or a hydrocarbyl group selected from alkyl, alkenyl, aryl, aralkyl, alkoxycarbonyl or alkylaryl groups, and one or more combinations thereof, and wherein $R^{53}$ and $R^{54}$ are each independently a hydrocarbyl group, selected from e.g. alkyl, alkenyl, aryl, aralkyl, alkoxycarbonyl or alkylaryl groups, and one or more combinations thereof.

Said hydrocarbyl group of $R^{53}$-$R^{54}$ may be linear, branched or cyclic; it may be substituted or unsubstituted; it may contain one or more heteroatoms; it may have from 1 to 10 carbon atoms, preferably from 1 to 8 carbon atoms, more preferably from 1-6 carbon atom, preferably 9,9-bis(methoxymethyl)fluorene (Flu). More information about this internal electron donor an several embodiments can be found in in WO2015/091983 which is incorporated by reference into the present application.

In an embodiment, the activator is added during stage I and the internal donor is added during stage I, preferably said activator being a benzamide, and the internal donor being a 1,3-diether. In a specific embodiment the activator BA-2Me is added during stage I and Flu is added during stage I.

In an embodiment, the activator is added during stage I and the internal donor is added during stages I and II, preferably said activator being a benzamide, and the internal donor being a 1,3-diether. In a specific embodiment the activator BA-2Me is added during stage I and Flu is added during stage I and stage II.

In an embodiment, during stage I of step D BA-2Me is added as activator and wherein during stages I and II Flu is added as internal donor in two portions, each portion having a weight ratio of from 60%:40% to 40%:60% wherein the total of the two portions equals 100%.

In a special embodiment, butyl magnesium Grignard is used in step A), TES is used in step B), TET and Ethanol are used in step C), TiCl$_4$ is used as catalytic species in all stages of step D); BA-2Me is used as activator in step D-I), Flu is used as internal donor in stages I and II. In a special embodiment, butyl magnesium Grignard is used in step A), TES is used in step B), TET and ethanol are first used in step C), TiCl$_4$ is used as catalytic species in all stages of step D); BA-2Me is used as activator in step D-I), Flu is used as internal donor in stages I and II.

Co-Catalyst

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", as described in WO2015091984 A1 of the same applicant, page 59 line 1 to page 60 line 30, which is incorporated here by reference.

External Electron Donor

The catalyst system according to the present invention preferably comprises an external electron donor. One of the functions of an external donor compound is to affect the stereoselectivity of the catalyst system in polymerization of olefins having three or more carbon atoms. Therefore it may be also referred to as a selectivity control agent. Examples of external donors suitable for use in the present invention are the internal donors benzoic acid esters and 1,3-diethers. In addition, the following external donors may be used: alkylamino-alkoxysilanes, alkyl-alkoxysilane, imidosilanes, and alkylimidosilanes. The aluminum/external donor molar ratio in the polymerization catalyst system preferably is from 0.1 to 200; more preferably from 1 to 100. Mixtures of external donors may be present and may include from about 0.1 mol. % to about 99.9 mol. % of a first external donor and from about 99.9 mol. % to about 0.1 mol. % of either a second or the additional alkoxysilane external donor disclosed below. When a silane external donor is used, the Si/Ti molar ratio in the catalyst system can range from 0.1 to 80, preferably from 0.1 to 60, even more preferably from 1 to 50 and most preferably from 2 to 30.

Documents EP1538167 and EP1783145 disclose a Ziegler-Natta catalyst type comprising an organo-silicon compound as external donor that is represented by formula $Si(OR^c)_3(NR^dR^e)$, wherein $R^c$ is a hydrocarbon group having 1 to 6 carbon atoms, $R^d$ is a hydrocarbon group having 1 to 12 carbon atoms or hydrogen atom, and $R^e$ is a hydrocarbon group having 1 to 12 carbon atoms used as an external electron donor. Examples of suitable external donors according to the present invention are known from WO2015091984 A1, being compounds according to Formula III, alkyl-alkoxysilanes according to Formula IV, organosilicon compounds having formula $Si(OR^a)_{4-n}R^b_n$, imidosilanes according to Formula I, alkylimidosilanes according to Formula I' as described on page 61 line 26 to page 67 line 8 which is incorporated here by reference. Alkoxy silane halide are used for preparing imidosilane and alkylimidosilane internal donors and are, respectively, according to Formula XXIVa: $ZnSi(OR^{11})_{4-n}$ and Formula XXIVa: $Z_nSi(OR^{11}_4)_{4-n-m}(R^{12})_m$. In the alkoxy silane halide represented by Formula XXIVa and XXIVb, Z is halogen group, and more preferably a chlorine group; n=1, 2 or 3; m=1 or 2. Specific examples regarding the external donor, considering Formula I' in WO2015091984 A1, are described in WO2015091984 A1 of the same applicant, page 67 lines 9-22, which is incorporated here by reference.

The additional compound(s) in the external donor according to the invention may be one or more alkoxysilanes, as described in WO2015091984 A1 of the same applicant, page 67 line 24 to page 69 line 4, which section is incorporated here by reference. In an embodiment, the silane-compound for the additional external donor is dicyclopentyl dimethoxysilane, di-isopropyl dimethoxysilane, di-isobutyl dimethyoxysilane, methylcyclohexyl dimethoxysilane, n-propyl trimethoxysilane, n-propyltriethoxysilane, dimethylamino triethoxysilane, and one or more combinations thereof. Preferably, the external donor is an alkyl-alkoxysilane according to formula IV (preferably n-propyl trimethoxysilane or n-propyl triethoxysilane) or cyclohexylmethyldimethoxysilane or another dialkyldialkoxysilane.

In an embodiment of this aspect, in stage D-I) the contacting temperature is between −30° C. to 120° C., or between 0° C. and 100° C., or between 10° C. and 60° C.; and contacting duration is between 10 to 150 minutes, or between 40 and 100 minutes. Then mixing the obtained reaction mixture takes place at a temperature of between 60° C. and 140° C., or between 90° C. and 120° C. for a period of between 10 to 150 minutes, or between 40 and 100 minutes; and the temperature of addition during this first stage is between 0 and 40° C., or between 20 and 30° C., or 25° C.; in stage D-II) the obtained reaction mixture is mixed at a temperature of between 60° C. and 140° C., or between 90° C. and 120° C. for a period of between 10 to 150 minutes, or between 40 and 100 minutes; in stage D-III) the obtained reaction mixture is mixed at a temperature of between 60° C. and 140° C., or between 90° C. and 120° C. for a period of between 10 to 150 minutes, or between 20 and 80 minutes; in stage D-IV) the obtained reaction mixture is mixed at a temperature of between 60° C. and 140° C., or between 90° C. and 120° C. for a period of between 10 to 150 minutes, or between 20 and 80 minutes;

Process for Preparing Procatalyst Including Low Temperature of Addition and Longer Stirring Time in Step D)

In another aspect, the invention relates to a process for the preparation of a procatalyst suitable for preparing a catalyst composition for olefin polymerization, said process comprising the steps of:
Step A) providing a compound $R^4_zMgX^4_{2-z}$ wherein $R^4$, $X^4$ and z are as discussed above;
Step B) contacting the compound $R^4_zMgX^4_{2-z}$ with a silane compound $Si(OR^5)_{4-n}(R^6)_n$ to give a first intermediate reaction product, being a solid $Mg(OR^1)_xX^1_{2-x}$ wherein $R^1$, $R^5$, $R^6$, $X^1$, n, x and z are as discussed above;
Step C) optionally contacting the solid support obtained in step B) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate reaction product; wherein $M^1$, $M^2$; $R^2$ $R^3$, and v and w are as discussed above;
Step D) reacting the first or second intermediate reaction product, obtained respectively in step B) or C), with a halogen-containing Ti-compound, an activator and at least one internal electron donor in several sub steps:
D-I) in a first stage: contacting the first or second intermediate reaction product, obtained respectively in step B) or C), with a halogen-containing Ti-compound, an activator and optionally an internal electron donor at a temperature of between −30° C. to 120° C., preferably between 0° C. and 100° C., more preferably between 10° C. and 60° C.; for a period of between 10 to 150 minutes, preferably between 40 and 100 minutes; and then mixing the obtained reaction mixture at a temperature of between 60° C. and 140° C., preferably between 90° C. and 120° C. for a period of between 10 to 150 minutes, preferably between 40 and 100 minutes; preferably the temperature of addition during this first stage is between 0 and 40° C., more preferably between 20 and 30° C., for example 25° C.;
D-II) in a second stage: contacting the product obtained in step D-I) with a halogen-containing Ti-compound, and optionally an internal electron donor and mixing the obtained reaction mixture at a temperature of between 60° C. and 140° C., preferably between 90° C. and 120° C. for a period of between 10 to 150 minutes, preferably between 40 and 100 minutes;
D-III) in a third stage: contacting the product obtained in step D-II) with a halogen-containing Ti-compound, and optionally an internal electron donor and mixing the obtained reaction mixture at a temperature of between 60° C. and 140° C., preferably between 90° C. and 120° C. for a period of between 10 to 150 minutes, preferably between 20 and 80 minutes;
D-IV) optionally in a fourth stage: contacting the product obtained in step D-III) with a halogen-containing Ti-compound, and optionally an internal electron donor and mixing the obtained reaction mixture at a temperature of between 60° C. and 140° C., preferably between 90° C. and 120° C. for a period of between 10 to 150 minutes, preferably between 20 and 80 minutes;
to obtain said procatalyst.

In an embodiment, the temperature of addition of the components during Stage I of step D) is between 0 and 40° C., such as between 20 and 30° C., for example 25° C.

In an embodiment, the mixture of Stage I of Step D is mixed at the addition temperature for a period of between 10 to 150 minutes, preferably between 20 and 100 minutes, such as between 40 and 90 minutes, such as 60 minutes prior to increasing the temperature.

In a specific embodiment of Step D, during stage I the addition is carried out at a temperature of between 20 and 30° C. and then mixed for a period of between 40 and 90 minutes, the temperature is then raised to between 90 and 120° C. and then mixed for a period of between 40 and 90 minutes; stage II the components are added and at a temperature between 90 and 120° C. and then mixed for a period of between 40 and 80 minutes; stage III the components are added and at a temperature between 90 and 120° C. and then mixed for a period of between 20 and 60 minutes; stage IV the components are added and at a temperature between 90 and 120° C. and then mixed for a period of between 20 and 60 minutes.

In a specific embodiment for the combination of BA-2Me and Flu, stage I is carried out with BA-2Me added at a temperature of 25° C. and heated to a reaction temperature of 115° C. and a stirring time of 60 minutes; stage II is carried out at 115° C. for 60 minutes, stage III at 115° C. for 60 minutes and stage IV at 115° C. for 30 minutes. In a specific embodiment, stage I is carried out with BA-2Me added at a temperature of 25° C. and heated to a reaction temperature of 115° C. and a stirring time of 60 minutes; stage II is carried out at 105° C. for 60 minutes, stage III at 105° C. for 30 minutes and stage IV at 105° C. for 60 minutes.

In a specific embodiment for the combination of EB and AB-OEt, stage I is carried out with EB added at temperature of 25° C. and heated to a reaction temperature of 115° C. and a stirring time of 90 minutes; stage II is carried out at 115° C. for 60 minutes, stage III at 115° C. for 30 minutes and stage IV at 115° C. for 30 minutes.

In a specific embodiment for the combination of EB and AB, stage I is carried out with EB added at a temperature of 25° C. and heated to a reaction temperature of 115° C. and a stirring time of 90 minutes; stage II is carried out at 115° C. for 60 minutes, stage III at 115° C. for 30 minutes and stage IV at 115° C. for 30 minutes.

In an embodiment of this aspect, wherein step ii) is carried out using ethanol as activating electron donor. In an embodiment of this aspect, step ii) is carried out using an activating electron donor and a metal alkoxide compound of formula $M^1(OR^2)_{v-w}(OR^3)_w$ during step ii), preferably ethanol as activating electron donor and titanium tetraethoxide (TET) as metal alkoxide compound. In an embodiment of this aspect, the internal donor is added in at least two of the stages of step D, or in three stages of step D.

Catalyst System

The invention also relates to a process to make the catalyst system by contacting a Ziegler-Natta type procatalyst, a co-catalyst and optionally one or more external electron donors. The procatalyst, the co-catalyst and the external donor(s) can be contacted in any way known to the skilled person in the art; and as also described herein, more specifically as in the Examples. The invention further relates to a process of preparing a polyolefin by contacting at least one olefin with a polymerization catalyst system comprising the procatalyst according to the present invention. Preferably, the polyolefin made by using the catalyst system of the present invention is a polypropylene. For instance, the external donor in the catalyst system according to the present invention can be complexed with the co-catalyst and mixed with the procatalyst (pre-mix) prior to contact between the procatalyst and the olefin. The external donor can also be added independently to the polymerization reactor. The procatalyst, the co-catalyst, and the external donor can be mixed or otherwise combined prior to addition to the polymerization reactor. Contacting the olefin with the catalyst system according to the present invention can be done under standard polymerization conditions, known to the skilled person in the art. See for example Pasquini, N. (ed.) "Polypropylene handbook" $2^{nd}$ edition, Carl Hanser Verlag Munich, 2005. Chapter 6.2 and references cited therein.

Polymerization Process

The polymerization process may be a gas phase, a slurry or a bulk polymerization process, operating in one or more than one reactor. One or more olefin monomers can be introduced in a polymerization reactor to react with the procatalyst and to form an olefin-based polymer (or a fluidized bed or agitated bed of polymer particles). Polymerization in a slurry (liquid phase) as well as information about the polyolefins that are/may be prepared are described in WO2015091984 A1 of the same applicant, page 70 line 15 to page 71 line 23 which section is incorporated here by reference; information about gas-phase polymerization processes are as described in WO2015091984 A1 of the same applicant, page 71 line 25 to page 72 line 26 which is incorporated here by reference.

Olefin

The olefin according to the invention may be selected from mono- and di-olefins containing from 2 to 40 carbon atoms; see also WO2015091984 A1 of the same applicant, page 72 line 28 to page 73 line 5 which section is incorporated here by reference. Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butene, hexene, heptene, octene.

Polyolefin

The present invention also relates to a polyolefin, preferably a polypropylene obtained or obtainable by a process, comprising contacting an olefin, preferably propylene or a mixture of propylene and ethylene with the procatalyst according to the present invention. More information about the polymers formed is disclosed WO2015091984 A1 of the same applicant, page 73 lines 6-23 and 25-34 and page 74 line 26 page 75, line 24 which section is incorporated by reference entirely. The present invention also relates to a polyolefin, preferably a propylene-based polymer obtained or obtainable by a process as described herein above, comprising contacting propylene or a mixture of propylene and ethylene with a catalyst system according to the present invention. In one embodiment the present invention relates to the production of a homopolymer of polypropylene. Several polymer properties are discussed here.

Xylene soluble fraction (XS) is preferably from about 0.5 wt % to about 10 wt %, or from about 0.5 wt % to about 8 wt %, or from 1.0 to 6 wt %. The production rate is preferably from about 1 kg/g/hr to about 100 kg/g/hr, or from about 20 kg/g/hr to about 90 kg/g/hr. MFR is preferably from about 0.01 g/10 min to about 2000 g/10 min, or from about 0.01 g/10 min to about 1000 g/10 min; or from about 0.1 g/10 min to about 500 g/10 min, or from about 0.5 g/10 min to about 150 g/10 min, or from about 1 g/10 min to about 100 g/10 min.

Use of Polyolefin

The invention also relates to the use of the polyolefins, preferably the propylene-based polymers (also called polypropylenes) according to the invention in injection moulding, blow moulding, extrusion moulding, compression moulding, casting, thin-walled injection moulding, etc. for example in food contact applications. Furthermore, the invention relates to a shaped article comprising the polyolefin, preferably the propylene-based polymer according to the present invention. The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging applications both for food and non-food segments. This includes pails and containers and yellow fats/margarine tubs and dairy cups.

The invention is now further elucidated by the following non-limiting examples.

EXAMPLES

Example 1 [not According to First Aspect of Invention; According to Second Aspect of Invention]

Step A)

Preparation of Grignard Reagent

A 1.7 L stirred flask, fitted with a reflux condenser and a funnel, was filled with magnesium powder (40.0 g, 1.65 mol). The flask was brought under nitrogen. The magnesium was dried at 80° C. for 2 hours under nitrogen purge, after which dibutyl ether (200 ml), iodine (0.05 g) and n-chlorobutane (10 ml) were successively added and stirred at 120 rpm. The temperature was maintained at 80° C. and a mixture of n-chlorobutane (146 ml) and dibutyl ether (1180 ml) was slowly added over 3 hours. The reaction mixture was stirred for another 3 hours at 80° C. Then the stirring and heating were stopped and the small amount of solid material was allowed to settle for 24 hours. By decanting the colorless solution above the precipitate, a solution of butyl magnesium chloride with a concentration of 0.90 mol Mg/L was obtained.

Step B) Preparation of the First Intermediate Reaction Product

Preparation of Support

The solution of reaction product of step A (500 ml, 0.45 mol Mg) and 260 ml of a solution of tetraethoxysilane (TES) in dibutyl ether (DBE), (47 ml of TES and 213 ml of DBE), were cooled to 5° C., and then were fed simultaneously to a mixing device (minimixer) of 0.45 ml volume equipped with a stirrer and jacket. The minimixer was cooled to 5° C. by means of cold water circulating in the minimixer's jacket. The stirring speed in the minimixer was 1000 rpm.

From the mixing device, the mixed components were directly dosed into a 1.3 liter reactor fitted with blade stirrer and containing 350 ml of dibutyl ether. The dosing temperature of the reactor was 35° C. and the dosing time was 360 min. On completion of the dosing, the reaction mixture was heated up to 60° C. in 30 minutes and held at this temperature for 1 hour. Then the stirring was stopped and the solid substance was allowed to settle. The supernatant was removed by decanting. The solid substance was washed three times using with 700 ml of heptane at a reactor temperature of 50° C. for three times. A pale yellow solid substance, reaction product B (the solid first intermediate reaction product; the support), was obtained upon drying with a nitrogen purge. The average particle size of support was 20 μm.

Step C) Preparation of the Second Intermediate Reaction Product

Activation of Support

In inert nitrogen atmosphere at 20° C. in a 1000 ml glass flask equipped with a mechanical agitator was filled with 50 g of reaction product B, dispersed in 500 ml of heptane and stirred at 250 rpm. Subsequently, a solution of 2.7 ml ethanol (EtOH/Mg=0.1) in 20 ml heptane was dosed under stirring during 1 hour. After keeping the reaction mixture at 20° C. for 30 minutes, a solution of 9.5 ml titanium tetraethoxide (TET/Mg=0.1) in 20 ml of heptane was added for 1 hour.

The slurry was slowly allowed to warm up to 30° C. over a period of 30 minutes and held at that temperature for another 2 hours. Finally, the supernatant liquid was decanted from the solid reaction product (the second intermediate reaction product C; activated support) which was washed once with 500 ml of heptane at 30° C. and dried using a nitrogen purge.

Step D) Preparation of the Procatalyst A

Stage I of Procatalyst Preparation

A 300 ml reactor-filter flask was brought under nitrogen and 125 mL of titanium tetrachloride was added, then 5.5 g of first activated support in 15 ml of heptane was added to the reactor at 25° C. Then, 0.89 g of N,N-dimethylbenzamide (BA-2Me/Mg=0.15 molar ratio) in 4 ml of chlorobenzene was added to the reactor in 10 minutes, and 1.0 g of 9,9-bis-methoxymethyl-9H-fluorene (Flu/Mg=0.1 molar ratio) in 3 ml of chlorobenzene was added to the reactor in 10 minutes. Temperature of reaction mixture was increased to 100° C. and then the reaction mixture was stirred at 100° C. for 60 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. The reaction mixture was stirred at 115° C. for 60 minutes. Then, the contents of the flask were filtered.

Stage IV of Procatalyst Preparation

A mixture of titanium tetrachloride (62.5 ml) and chlorobenzene (62.5 ml) was added to the reactor. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst A produced is given in Table 1.

Example 2 [not According to First Aspect of Invention; According to Second Aspect of Invention]

Preparation of the Procatalyst B

Example 2 was carried out in the same way as Example 1, except that stages II, III and IV of procatalyst preparation were carried out at 105° C. instead of 115° C. The composition of the solid procatalyst B produced is given in Table 1.

Example 3 [According to First Aspect of Invention; According to Second Aspect of Invention]

Preparation of the Procatalyst C

Steps A-C are carried out in the same way as in Example 1. Step D) was carried out as follows.

Stage I of Procatalyst Preparation

A 300 ml reactor-filter flask was brought under nitrogen and 125 mL of titanium tetrachloride was added, then 5.5 g of first activated support in 15 ml of heptane was added to the reactor. The contents of the reactor were stirred for 60 minutes at room 25° C. Then, 0.89 g of N,N-dimethylbenzamide (BA-2Me/Mg=0.15 molar ratio) in 4 ml of chlorobenzene was added to the reactor in 10 minutes, and 0.5 g of 9,9-bis-methoxymethyl-9H-fluorene (Flu/Mg=0.05 molar ratio) in 3 ml of chlorobenzene was added to the reactor in 10 minutes. Temperature of reaction mixture was increased to 100° C. and then the reaction mixture was stirred at 100° C. for 60 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. Then, 0.5 g of 9,9-bis-methoxymethyl-9H-fluorene (flu/Mg=0.05 molar ratio) in 3 ml of chlorobenzene was added to the reactor in 10 minutes. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. The reaction mixture was stirred at 115° C. for 60 minutes. Then, the contents of the flask were filtered.

Stage IV of Procatalyst Preparation

A mixture of titanium tetrachloride (62.5 ml) and chlorobenzene (62.5 ml) was added to the reactor. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst C produced is given in Table 1.

Example 4 [According to First Aspect of Invention; According to Second Aspect of Invention]

Preparation of the Procatalyst D

Example 4 was carried out in the same way as Example 3, except that in stage I of procatalyst preparation 0.7 g instead of 0.5 g of 9,9-bis-methoxymethyl-9H-fluorene was used and in II stage of procatalyst preparation 0.7 g instead of 0.5 g of 9,9-bis-methoxymethyl-9H-fluorene was used. The composition of the solid procatalyst D produced is given in Table 1.

Example 5 [According to First Aspect of Invention; According to Second Aspect of Invention]

Preparation of the Procatalyst E

Steps A-C are carried out as in Example 1. Step D) was carried out as follows:

Stage I of Procatalyst Preparation

A 300 ml reactor-filter flask was brought under nitrogen and 125 mL of titanium tetrachloride was added, then 5.5 g of second activated support in 15 ml of heptane was added to the reactor at 25° C. Then, 1.78 ml of ethylbenzoate, EB (EB/Mg=0.30 molar ratio) in 4 ml of chlorobenzene was added to the reactor in 10 minutes. Temperature of reaction mixture was increased to 115° C. and then the reaction mixture was stirred at 115° C. for 90 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. Then, 0.60 g of 4-[(ethoxycarbonyl)(methyl)amino]pentan-2-yl-ethyl carbamate (AB-OEt/Mg=0.06) in 4 ml of chlorobenzene was added to the reactor in 10 minutes. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. Then, 0.48 g of 4-[(ethoxycarbonyl)(methyl)amino]pentan-2-yl-ethyl carbamate (AB-OEt/Mg=0.05) in 4 ml of chlorobenzene was added to the reactor in 10 minutes. The reaction mixture was stirred at 115° C. for 30 minutes. Then, the contents of the flask were filtered.

Stage IV of Procatalyst Preparation

A mixture of titanium tetrachloride (62.5 ml) and chlorobenzene (62.5 ml) was added to the reactor. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst E produced is given in Table 1.

Example 6 [According to First Aspect of Invention; According to Second Aspect of Invention]

Preparation of the Procatalyst F

Steps A-C are carried out as in Example 1. Step D) was carried out as follows:

Stage I of Procatalyst Preparation

A 300 ml reactor-filter flask was brought under nitrogen and 125 mL of titanium tetrachloride was added, then 5.5 g of single activated support in 15 ml of heptane was added to the reactor at 25° C. Then, 1.78 ml of ethylbenzoate, EB (EB/Mg=0.30 molar ratio) in 4 ml of chlorobenzene was added to the reactor in 10 minutes. Temperature of reaction mixture was increased to 115° C. and then the reaction mixture was stirred at 115° C. for 90 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. Then, 0.36 g of 4-[(ethoxycarbonyl)(methyl)amino]pentan-2-yl-ethyl carbamate (AB-OEt/Mg=0.03) in 4 ml of chlorobenzene was added to the reactor in 10 minutes. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. Then, 0.36 g of 4-[(ethoxycarbonyl)(methyl)amino]pentan-2-yl-ethyl carbamate (AB-OEt/Mg=0.03) in 4 ml of chlorobenzene was added to the reactor in 10 minutes. The reaction mixture was stirred at 115° C. for 30 minutes. Then, the contents of the flask were filtered.

Stage IV of Procatalyst Preparation

A mixture of titanium tetrachloride (62.5 ml) and chlorobenzene (62.5 ml) was added to the reactor. Then, 0.36 g of 4-[(ethoxycarbonyl)(methyl)amino]pentan-2-yl-ethyl carbamate (AB-OEt/Mg=0.03) in 4 ml of chlorobenzene was added to the reactor in 10 minutes. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst F produced is given in Table 1.

Example 7 [not According to First Aspect of Invention; not According to Second Aspect of Invention]

Preparation of the Procatalyst G

Step A') Grignard Formation Step

Preparation of Grignard Reagent

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butyl magnesium chloride with a concentration of 1.0 mol Mg/l was obtained.

Step B') Preparation of the First Intermediate Reaction Product

Preparation of Support

This step was carried out as described in Example XX of EP 1 222 214 B1, except that the dosing temperature of the reactor was 35° C., the dosing time was 360 min and a stirrer was used. 250 ml of dibutyl ether was introduced to a 1 liter reactor. The reactor was thermostated at 35° C.

The solution of reaction product of step A' (360 ml, 0.468 mol Mg) and 180 ml of a solution of tetraethoxysilane (TES) in dibutyl ether (DBE), (55 ml of TES and 125 ml of DBE), were cooled to 10° C., and then were dosed simultaneously to a mixing device of 0.45 ml volume supplied with a stirrer and jacket. From the mixing device, the mixed components were directly introduced into the reactor. The mixing device (minimixer) was cooled to 10° C. by means of cold water circulating in the minimixer's jacket. Dosing time was 360 min. The stirring speed in the minimixer was 1000 rpm.

On the dosing completion the reaction mixture was heated up to 60° C. and kept at this temperature for 1 hour. Then the stirring was stopped and the solid substance was allowed to settle. The supernatant was removed by decanting. The solid substance was washed three times using 500 ml of heptane. As a result, a pale yellow solid substance, reaction product B (the solid first intermediate reaction product; the support), was obtained, suspended in 200 ml of heptane. The average particle size of support was 22 μm and span value (d90–d10)/d50=0.5.

Step C') Preparation of the Second Intermediate Reaction Product

Activation of Support

Support activation was carried out as described in Example IV of WO/2007/134851 to obtain the second intermediate reaction product. Under inert nitrogen atmosphere at 20° C. a 250 ml glass flask equipped with a mechanical agitator was filled with slurry of 5 g of reaction product of step B' dispersed in 60 ml of heptane.

Subsequently a solution of 0.22 ml ethanol (EtOH/Mg=0.1) in 20 ml heptane was dosed under stirring during 1 hour. After keeping the reaction mixture at 200° C. for 30 minutes, a solution of 0.79 ml titanium tetraethoxide (TET/Mg=0.1) in 20 ml of heptane was added for 1 hour.

The slurry was slowly allowed to warm up to 300° C. for 90 min and kept at that temperature for another 2 hours. Finally the supernatant liquid was decanted from the solid reaction product (the second intermediate reaction product; activated support) which was washed once with 90 ml of heptane at 300° C.

Step D') Preparation of Procatalyst

Stage I of Procatalyst Preparation

A 250 mL reactor is brought under nitrogen and 125 ml of titanium tetrachloride is added to it. The reactor is heated to 90° C. under stirring and a suspension, containing about 5.5 g of activated support in 15 ml of heptane, is added to it under stirring. Then N,N-dimethylbenzamide (BA-2Me/Mg=0.15 molar ratio) in 2 ml of chlorobenzene is added to reactor. Then 9,9-bis-methoxymethyl-9H-fluorene (Flu/Mg=0.1 molar ratio) in 2 ml of chlorobenzene is added. The reaction mixture was kept at 90° C. for 60 min. The solid is allowed to settle and is washed with 125 ml chlorobenzene at 90° C. for 15-20 min. The solid is allowed to settle and decanted.

Stage II of Procatalyst Preparation

Then a mixture of 62.5 ml of titanium tetrachloride and 62.5 ml of chlorobenzene is added to reactor. The reaction mixture is kept at 90° C. for 30 minutes under stirring. The solid is allowed to settle and decanted.

Stage III of Procatalyst Preparation

Then a mixture of 62.5 ml of titanium tetrachloride and 62.5 ml of chlorobenzene is added to reactor, the temperature is set to 115° C. to reactor. Temperature of reaction mixture is maintained at 115° C. and the reaction mixture is kept at 115° C. for 30 min. Then the stirring is stopped and the solid substance is allowed to settle. The supernatant is removed by decanting.

Stage IV of Procatalyst Preparation

Then a mixture of 62.5 ml of titanium tetrachloride and 62.5 ml of chlorobenzene is added to reactor, the temperature is set to 115° C. to reactor. Temperature of reaction mixture is maintained at 115° C. and the reaction mixture is kept at 115° C. for 30 min. Then the stirring is stopped and the solid substance is allowed to settle. The supernatant is removed by decanting.

Work Up of Procatalyst

The solid substance obtained is washed five times using 100-150 ml of heptane at 60° C., after which the procatalyst, suspended in heptane, is obtained. The composition of the solid procatalyst G produced is given in Table 1.

Example 8 [According to First Aspect of Invention; not According to Second Aspect of Invention]

Preparation of the Procatalyst H

Steps A'), B') and C') were carried out as in Example 7. Step D') is carried out as follows.

Step D') Preparation of Procatalyst

Stage I of Procatalyst Preparation

A reactor was brought under nitrogen and 125 ml of titanium tetrachloride was added to it. The reactor was heated to 100° C. and a suspension, containing about 5.5 g of activated support (step C') in 15 ml of heptane, was added to it under stirring. Then the temperature of reaction mixture was increased to 110° C. for 10 min and 1.76 g of ethylbenzoate (EB/Mg molar ratio=0.3) in 2 ml of chlorobenzene was added to reactor and the reaction mixture was kept at 110° C. for 60 min. Then the stirring was stopped and the solid substance was allowed to settle. The supernatant was removed by decanting, after which the solid product was washed with chlorobenzene (125 ml) at 100° C. for 20 min. Then the washing solution was removed by decanting.

Stage II of Procatalyst Preparation

Then a mixture of titanium tetrachloride (62.5 ml) and chlorobenzene (62.5 ml) was added. The reaction mixture was kept at 115° C. Then 0.55 gram of internal donor 4-[(ethoxycarbonyl)(methyl)amino]pentan-2-yl ethyl carbamate (AB-OEt/Mg molar ratio=0.50) in 2 ml of chlorobenzene was added and stirred at 115° C. for 60 min, after which the solid substance was allowed to settle. The supernatant was removed by decanting.

Stage III of Procatalyst Preparation

Then a mixture of titanium tetrachloride (62.5 ml) and chlorobenzene (62.5 ml) was added. The reaction mixture was kept at 115° C. Then 0.44 gram of internal donor obtained 4-[(ethoxycarbonyl)(methyl)amino]pentan-2-yl ethyl carbamate (AB-OEt/Mg molar ratio=0.40) in 2 ml of chlorobenzene was added and stirred at 115° C. for 30 min, after which the solid substance was allowed to settle. The supernatant was removed by decanting.

Stage IV of Procatalyst Preparation

Then a mixture of titanium tetrachloride (62.5 ml) and chlorobenzene (62.5 ml) was added. The reaction mixture was kept at 115° C. for 30 minutes after which the solid substance was allowed to settle. The supernatant was removed by decanting.

Work Up of Procatalyst

The solid substance obtained was washed five times using 150 ml of heptane at 60° C., after which the procatalyst, suspended in heptane, was obtained.

The composition of the solid procatalyst H produced is given in Table 1.

Polymerization of Propylene Using Procatalysts A to H

Liquid pool propylene polymerization was carried out in a one gallon bench scale reactor. The method of polymerization involved baking the polymerization reactor at 110° C. for 60 min, applying three high pressure (15 bar) nitrogen purges at 110° C., then lowering the reactor temperature to 30° C. whilst purging the reactor with nitrogen. Then the reactor was purged three times, with 50 g of propylene for each purge. Then, 1.375 kg of liquid propylene was introduced to the reactor followed by the addition of 200 psig hydrogen to the reactor from an 75 mL stainless steel cylinder. The reactor temperature was then raised to 62° C., and stirring speed set to 500 rpm. Then, 0.25 mmol of the neat external electron donor, cyclohexyl-methyldimethoxysilane, was injected to the reactor. Then, 2.0 mmol of co-catalyst, triethylaluminium was injected in the reactor. Then procatalyst, corresponding to 0.01 mmol Ti, was injected to the reactor. The reactor temperature was raised to 67° C. and the stirring speed increased to 1500 rpm and polymerization was carried out for one hour. After this period, the propylene in the reactor was vented and the product polypropylene was obtained. The yield was determined after allowing the product to dry. Polymerization and product analysis results are given in Table 2.

TABLE 1

| Cat | Ex. | d50 [µm] | Mg [%] | Ti [%] | ID | ID [%] | Activator | Activator [%] | EtO [%] |
|---|---|---|---|---|---|---|---|---|---|
| A | 1 | 19.17 | 16.78 | 2.17 | Flu | 15.45 | BA-2Me | 1.28 | 1.92 |
| G | 7 | 18.33 | 18.20 | 1.95 | Flu | 16.00 | BA-2Me | 1.24 | 2.90 |
| B | 2 | 17.70 | 18.20 | 2.10 | Flu | 14.60 | BA-2Me | 0.87 | 2.50 |
| C | 3 | 17.78 | 18.10 | 1.79 | Flu | 17.70 | BA-2Me | 1.10 | 2.90 |
| D | 4 | 16.81 | 17.40 | 2.11 | Flu | 19.11 | BA-2Me | 0.86 | 2.33 |
| E | 5 | 20.55 | 19.00 | 1.82 | AB-OEt | 3.09 | EB | 0.92 | 2.70 |
| H | 8 | 17.48 | 14.77 | 2.09 | AB-OEt | 9.86 | EB | 0.70 | 2.40 |
| F | 6 | 21.95 | 21.73 | 2.29 | AB-OEt | 2.83 | EB | 1.02 | 2.75 |

TABLE 2

| Cat | Ex. | Prod. [kg/g cat] | BD [kg/m³] | APS [mm] | Fines [%] | Mw [g/mol] | Mn [g/mol] | MWD | MI [2.16 Kg] | XS [%] |
|---|---|---|---|---|---|---|---|---|---|---|
| A | 1 | 24.6 | 371 | | | 243607 | 55057 | 4.40 | 10.9 | 3.11 |
| G | 7 | 12.4 | 326 | — | — | 193422 | 29176 | 6.63 | — | 2.50 |
| B | 2 | 24.5 | 369 | 0.494 | 0.05 | 291000 | 54000 | 5.40 | 13.9 | 2.85 |
| C | 3 | 27.0 | 395 | 0.483 | 0.19 | 275401 | 65878 | 4.20 | 13.3 | 2.07 |
| D | 4 | 25.0 | 383 | 0.512 | 0.10 | 255456 | 57222 | 4.46 | 13.7 | 1.92 |
| E | 5 | 21.2 | 400 | 0.523 | 0.09 | 411556 | 82082 | 5.00 | 2.09 | 2.87 |
| H | 8 | 17.3 | 399 | — | — | 405694 | 61216 | 6.63 | — | 3.34 |
| F | 6 | 22.5 | 401 | 0.502 | 0.24 | 385528 | 81882 | 4.65 | 2.92 | 3.14 |

The effect of the lowered temperature during the addition of the donors during stage I is clear when Examples 1-4 are compared to Example 7 (which is a comparative example). The catalyst productivity is more than doubled from 12.4 to a value between 24.5 and 27.0. The bulk density is increased from 326 to a value between 369 and 395. The MWD is lowered from 6.63 to a value between 4.20 and 5.40. The Mn is doubled from 29176 to a value between 54000 and 65878, hence there are less oligomers. One or more aims are therefore achieved by the present invention: being high catalyst productivity, high bulk density, narrow molecular weight distribution, increased Mn (low oligomers) and low xylene solubles. Enhanced product physical and mechanical properties are expected such as for fibres, injection molded products and films with such products.

When Example 1 is compared to Example 7 (comparative) it is clear that a low temperature of addition of the reagents in Stage I of step D (25° C. for Example 1 versus 90° C. for Example 7) as well as a longer stirring duration of Stage II of step D (60 minutes for Example 1 versus 30 minutes for Example 7) leads to a doubling in the productivity (from 12.4 to 24.6), an increase in bulk density (from 326 to 371), an increase in Mw and Mn and a decrease in MWD (from 6.63 to 4.40).

When Example 5 is compared to Example 8 it is clear that a low temperature of addition of the reagents in Stage I of step D (25° C. for Example 5 versus 100° C. for Example 8) as well as a longer stirring duration of Stage I of step D (90 minutes for Example 5 versus 60 minutes for Example 8) leads to an increase in the productivity (from 17.3 to 21.2), an increase in Mn (lower oligomers) and narrower MWD (from 6.63 to 5.00) as well as lower XS (from 3.34 to 2.87).

What can moreover been deducted from the present invention, is that temperature during the process can surprisingly be used to control product parameters, such as MI, MWD and XS. It is noted that the temperature in stages II, III and IV is decreased from 115° C. in Example 1 to 105° C. in Example 2. This is results in the following. The MWD is higher (5.4 compared to 4.4); the MI is higher (13.9 compared to 10.6); and the XS is lower (2.85 compared to 3.11).

The split (e.g. double or triple) addition of internal donor improves the incorporation of the internal donor in the catalyst from, which represents a significant saving on donor utilization. It increases the productivity, bulk density, MI and decreases XS. Also, surprisingly the Mn is higher (lower oligomers) with split addition of the internal donor.

When Example 3 (half of Flu in stage I and half of Flu in stage II) is compared to Example 1 (all Flu in stage I, total amount the same) the following effects are visible. The productivity is higher (27.0 compared to 24.6); the bulk density is higher (395 compared to 371); the MI is higher (13.3 compared to 10.9); and XS is lower (2.07 compared to 3.11). The split addition increases the incorporation of the Flu in the catalyst from 15.45% to 17.7%.

When Example 6 (triple addition of AB-OEt) is compared to Example 5 (double addition of AB-OEt) the following effects are visible. The productivity is somewhat higher (22.5 compared to 21.2); the MI is higher (2.92 compared to 2.09); the MWD is lower (4.65 compared to 5.00)

Surprising the procatalyst in this disclosure was found to produce high procatalyst productivity, high bulk density, narrow molecular weight distribution, increased Mn (low oligomers) and low xylene solubles. Enhanced product physical and mechanical properties are expected such as for fibres, injection molded products and films with such products. Hence one or more objects of the present invention have been obtained.

The invention claimed is:

1. A process for the preparation of a procatalyst suitable for preparing a catalyst composition for olefin polymerization, said process comprising the steps of Step A) providing or preparing a compound having the formula $R^4_z MgX^4_{2-z}$ wherein
 $R^4$ is independently a linear, branched or cyclic hydrocarbyl group selected from alkyl, alkenyl, aryl, aralkyl, alkylaryl groups, and one or more combinations thereof;
 wherein said hydrocarbyl group is substituted or unsubstituted, and optionally contains one or more heteroatoms;
 $X^4$ is independently fluoride (F—), chloride (Cl—), bromide (Br—) or iodide (I—);
 z is in a range of larger than 0 and smaller than 2, being $0<z<2$;

Step B) contacting the compound $R^4_z MgX^4_{2-z}$ obtained in step A) with a silane compound $Si(OR^5)_{4-n}(R^6)_n$ to give a first intermediate reaction product, being a solid $Mg(OR^1)_x X^1_{2-x}$, wherein:
 $R^1$, $R^5$ and $R^6$ are each independently a linear, branched or cyclic hydrocarbyl group selected from alkyl, alkenyl, aryl, aralkyl, alkoxycarbonyl, alkylaryl groups, and one or more combinations thereof; wherein said hydrocarbyl group is substituted or unsubstituted, and optionally contains one or more heteroatoms;
 $X^1$ is independently fluoride (F—), chloride (Cl—), bromide (Br—) or iodide (I—);
 n is in range of 0 to 4;
 x is in a range of larger than 0 and smaller than 2, being $0<x<2$;

Step C) optionally contacting the first intermediate reaction product obtained in step B) with at least one activating compound formed by an activating electron donor and a metal alkoxide compounds of the formula $M^1(OR^2)_{v-w}(OR^3)_w$ or $M^2(OR^2)_{v-w}(R^3)_w$, to obtain a second intermediate reaction product; wherein: $M^1$ is a metal of Ti, Zr, Hf, Al or Si; $M^2$ is a metal being Si; v is the valency of $M^1$ or $M^2$ and $w<v$; $R^2$ and $R^3$ are each a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group may be is substituted or unsubstituted, and optionally contains one or more heteroatoms;

Step D) reacting the first or second intermediate reaction product, obtained respectively in step B) or C), with a halogen-containing Ti-compound, an activator and at least one internal electron donor in several sub steps:
 D-I) in a first stage: contacting the first or second intermediate reaction product, obtained respectively in step B) or C), with the halogen-containing Ti-compound, the activator and optionally a portion of the internal electron donor;
 D-II) in a second stage: contacting the product obtained in step D-I) with the halogen-containing Ti-compound, and optionally a portion of the internal electron donor;
 D-III) in a third stage: contacting the product obtained in step D-II) with the halogen-containing Ti-compound, and optionally a portion of the internal electron donor;

D-IV) optionally in a fourth stage: contacting the product obtained in step D-III) with the halogen-containing Ti-compound, and optionally a portion of the internal electron donor;
wherein said internal electron donor is added in at least two portions during at least two of the stages D-I, D-II, D-III, and D-IV to obtain said procatalyst.

2. The process according to claim 1, wherein the internal electron donor is added in two portions wherein the amount of the internal electron donor is split between these two portions in a weight ratio of from 80%:20% to 20%:80%.

3. The process according to claim 1, wherein the internal electron donor is added in three portions wherein the amount of the internal electron donor is split between these three portions in a weight ratio of from 20% to 40% for each portion, wherein the total of the three portions is 100%.

4. The process according to claim 1, wherein the activator is one of the following: i) a monoester, or ii) a benzamide according to formula X:

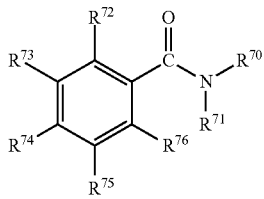

wherein $R^{70}$ and $R^{71}$ are each independently hydrogen or an alkyl, and $R^{72}$, $R^{73}$, $R^{74}$, $R^{75}$, and $R^{76}$ are each independently hydrogen, a heteroatom, or a hydrocarbyl group, selected from alkyl, alkenyl, aryl, aralkyl, alkoxycarbonyl, alkylaryl groups, and one or more combinations thereof.

5. The process according to claim 1, wherein the internal electron donor is one of the following: i) a carbonate-carbamate compound according to formula A:

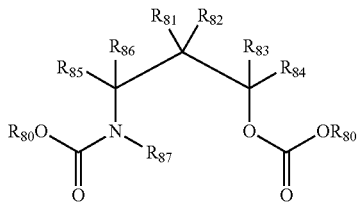

wherein: $R^{81}$, $R^{82}$, $R^{83}$, $R^{84}$, $R^{85}$, and $R^{86}$ are the same or different and are independently hydrogen or a linear, branched or cyclic hydrocarbyl group, selected from alkyl, alkenyl, aryl, aralkyl, alkylaryl groups, and one or more combinations thereof; $R^{87}$ is a hydrogen or a linear, branched or cyclic hydrocarbyl group, selected from alkyl, alkenyl, aryl, aralkyl, alkoxycarbonyl, alkylaryl groups, and one or more combinations thereof each $R^{80}$ group is independently a linear, branched or cyclic hydrocarbyl group selected from alkyl, alkenyl, aryl, aralkyl, alkylaryl groups, and one or more combinations thereof; $R^{80}$ is an alkyl having 1 to 30 carbon atoms; N is a nitrogen atom; 0 is an oxygen atom; and C is a carbon atom;
or ii) an aminobenzoate compound according to Formula B

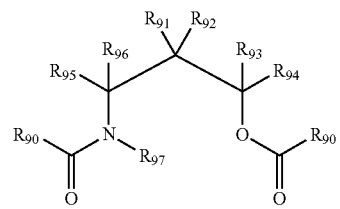

wherein each $R^{90}$ group is independently a substituted or unsubstituted aromatic group; $R^{91}$, $R^{92}$, $R^{93}$, $R^{94}$, $R^{95}$, $R^{96}$ and $R^{97}$ are the same or different and are independently hydrogen or a linear, branched or cyclic hydrocarbyl group, selected from alkyl, alkenyl, aryl, aralkyl, alkylaryl groups, and one or more combinations thereof; N is nitrogen atom; O is oxygen atom; and C is carbon atom; or
iii) a 1,3-diether represented by the Formula C,

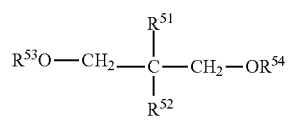

wherein $R^{51}$ and $R^{52}$ are each independently a hydrogen or a hydrocarbyl group selected from alkyl, alkenyl, aryl, aralkyl, alkoxycarbonyl, alkylaryl groups, and one or more combinations thereof, and wherein $R^{53}$ and $R^{54}$ are each independently a hydrocarbyl group, selected from alkyl, alkenyl, aryl, aralkyl, alkoxycarbonyl, alkylaryl groups, and one or more combinations thereof; said hydrocarbyl group of $R^{53}$-$R^{54}$ is linear, branched or cyclic; and said hydrocarbyl group is substituted or unsubstituted, and optionally contains one or more heteroatoms.

6. The process according to claim 1, wherein during stage I of step D) N,N-dimethyl benzamide is added as activator and wherein during stages I and II bis(methoxymethyl)fluorene is added as internal electron donor in two portions, each portion having a weight ratio of from 60%:40% to 40%:60% wherein the total of the two portions equals 100%.

7. The process according to claim 1, wherein during stage I of step D) ethyl benzoate is added as the activator and wherein during stages II and III 4-[(ethoxycarbonyl)(methyl)amino]pentan-2-yl ethyl carbamate is added as the internal electron donor in two portions, each portion having a weight ratio of from 60%:40% to 40%:60% wherein the total of the two portions equals 100% or wherein during stage I of step D) ethyl benzoate is added as the activator and wherein during stages II, III and IV, 4-[(ethoxycarbonyl)(methyl)amino]pentan-2-yl ethyl carbamate is added as the internal electron donor in three portions, each portion having a weight ratio of from 20% to 40%, wherein the total of the three portions equals 100%.

8. The process according to claim 1, wherein during stage I of step D) ethyl benzoate is added as the activator and wherein during stages II and III 4-[benzoyl(methyl)amino]pentan-2-yl benzoate is added as the internal electron donor in two portions, each portion having a weight ratio of from 60%:40% to 40%:60% wherein the total of the two portions equals 100%.

9. The process according to claim 1, wherein step C) is carried out using an activating electron donor and a metal alkoxide compound of formula $M^1(OR^2)_{v-w}(OR^3)_w$.

10. A process for the preparation of a procatalyst in a catalyst composition for olefin polymerization, said process comprising the steps of:

Step A) providing or preparing a compound $R^4{}_zMgX^4{}_{2-z}$ wherein
$R^4$ is independently a linear, branched or cyclic hydrocarbyl group independently selected from alkyl, alkenyl, aryl, aralkyl, alkylaryl groups, and one or more combinations thereof;
wherein said hydrocarbyl group may be substituted or unsubstituted, may contain one or more heteroatoms;
$X^4$ is independently fluoride (F—), chloride (Cl—), bromide (Br—) or iodide (I—);
z is in a range of larger than 0 and smaller than 2, being $0<z<2$;

Step B) contacting the compound $R^4{}_zMgX^4{}_{2-z}$ with a silane compound $Si(OR^5)_{4-n}(R^6)_n$ to provide a first intermediate reaction product, being a solid $Mg(OR^1)_xX^1{}_{2-x}$ wherein:
$R^5$ and $R^6$ are each independently a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group is substituted or unsubstituted, and optionally contains one or more heteroatoms;
$X^1$ is independently fluoride (F—), chloride (Cl—), bromide (Br—) or iodide (I—);
n is in range of 0 to 4;
x is in a range of larger than 0 and smaller than 2, being $0<x<2$;

Step C) optionally contacting the first intermediate reaction product obtained in step B) with at least one activating compound formed by an activating electron donor and a metal alkoxide compound of the formula $M^1(OR^2)_{v-w}(OR^3)_w$ or $M^2(OR^2)_{v-w}(R^3)_w$, to obtain a second intermediate reaction product; wherein: $M^1$ is a metal of Ti, Zr, Hf, Al or Si; $M^2$ is a metal being Si; v is the valency of $M^1$ or $M^2$ and $w<v$; $R^2$ and $R^3$ are each a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group may be is substituted or unsubstituted, and optionally contains one or more heteroatoms;

Step D) reacting the first or second intermediate reaction product, obtained respectively in step B) or C), with a halogen-containing Ti-compound, an activator and at least one internal electron donor in several sub steps:
D-I) in a first stage: contacting the first or second intermediate reaction product, obtained respectively in step B) or C), with the halogen-containing Ti-compound, the activator and optionally the internal electron donor at a temperature of between 0° C. and 40° C., for a period of between 10 to 150 minutes, and then mixing the obtained reaction mixture at a temperature of between 60° C. and 140° C.;
D-II) in a second stage: contacting the product obtained in step D-I) with the halogen-containing Ti-compound, and optionally the internal electron donor and mixing the obtained reaction mixture at a temperature of between 60° C. and 140° C.;
D-III) in a third stage: contacting the product obtained in step D-II) with the halogen-containing Ti-compound, and optionally the internal electron donor and mixing the obtained reaction mixture at a temperature of between 60° C. and 140° C.;
D-IV) optionally in a fourth stage: contacting the product obtained in step D-III) with the halogen-containing Ti-compound, and optionally the internal electron donor and mixing the obtained reaction mixture at a temperature of between 60° C. and 140° C.;

to obtain said procatalyst.

11. The process according to claim 2,
wherein the amount of the internal electron donor is split between the two portions in a weight ratio of from 60%:40% to 40%:60%.

12. The process according to claim 3, wherein each portion is between 30 to 35% of the total amount of the internal electron donor.

13. The process according to claim 4, wherein
the activator is
the monoester selected from the group consisting of butyl formate, ethyl acetate, amyl acetate, butyl acetate, ethyl acrylate, methyl methacrylate, isobutyl methacrylate, ethyl p-methoxy benzoate, methyl p-ethoxybenzoate, ethyl p-ethoxybenzoate, ethyl benzoate, methyl benzoate, propyl benzoate, ethyl p-chlorobenzoate, ethyl p-bromobenzoate, methyl-p-toluate and ethyl-naphthate,
or
the benzamide is-selected from benzamide wherein $R^{70}$-$R^{76}$=H, methyl benzamide wherein $R^{70}$=methyl and $R^{71}$-$R^{76}$=H, and N,N-dimethyl benzamide wherein $R^{70}$, $R^{71}$=methyl and $R^{72}$-$R^{76}$=H; and
the internal electron donor is 4-[(ethoxycarbonyl)(methyl)amino]pentan-2-yl ethyl carbamate, or 4-[benzoyl(methyl)amino]pentan-2-yl benzoate, or bis(methoxymethyl)fluorene.

14. The process according to claim 10, wherein step D-I comprising mixing the obtained reaction mixture at a temperature between 90° C. and 120° C. for a period of between 40 and 100 minutes.

15. The process according to claim 10, wherein the internal electron donor is added in at least two portions during at least two of the stages D-I, D-II, D-III, and D-IV to obtain said procatalyst.

16. A process for the preparation of a polyolefin, the process comprising:
preparing a procatalyst in accordance with the process of claim 1,
combining the procatalyst with a co-catalyst and optionally an external electron donor to form a catalyst system, and
contacting the catalyst system with at least one olefin, to prepare the polyolefin.

* * * * *